United States Patent
Allen

(10) Patent No.: US 7,470,294 B2
(45) Date of Patent: Dec. 30, 2008

(54) FUEL PROCESSOR DESIGN AND METHOD OF MANUFACTURE

(75) Inventor: George M. Allen, Middle Grove, NY (US)

(73) Assignee: Plug Power Inc., Latham, NY (US)

( * ) Notice: Subject to any disclaimer, the term of this patent is extended or adjusted under 35 U.S.C. 154(b) by 680 days.

(21) Appl. No.: 10/184,291

(22) Filed: Jun. 27, 2002

(65) Prior Publication Data

US 2003/0064010 A1    Apr. 3, 2003

Related U.S. Application Data

(60) Provisional application No. 60/302,334, filed on Jun. 29, 2001.

(51) Int. Cl.
- B01J 7/00    (2006.01)
- B01J 8/04    (2006.01)
- B01J 10/00   (2006.01)
- H01M 8/06    (2006.01)
- C10J 3/20    (2006.01)
- F28D 21/00   (2006.01)
- B21D 51/16   (2006.01)

(52) U.S. Cl. .......................... 48/118.5; 48/61; 422/188; 422/189; 422/202; 29/890

(58) Field of Classification Search ............... 48/61–89, 48/119–127, 197–202, 118.5, 197 R; 422/171–222, 422/232–235; 429/13–24; 165/121–125; 423/648–252

See application file for complete search history.

(56) References Cited

U.S. PATENT DOCUMENTS

| | | | | |
|---|---|---|---|---|
| 3,528,783 | A * | 9/1970 | Haselden | 422/188 |
| 4,049,388 | A * | 9/1977 | Scheitlin et al. | 422/171 |
| 5,866,859 | A * | 2/1999 | Karlsson et al. | 181/230 |
| 5,928,597 | A * | 7/1999 | Van Ert | 264/316 |
| 5,950,419 | A * | 9/1999 | Nishimura et al. | 60/274 |
| 6,051,163 | A * | 4/2000 | Kumberger et al. | 252/373 |
| 6,071,593 | A * | 6/2000 | Lang et al. | 428/167 |
| 6,159,434 | A * | 12/2000 | Gonjo et al. | 422/191 |
| 6,203,587 | B1 * | 3/2001 | Lesieur et al. | 48/61 |
| 6,352,792 | B1 * | 3/2002 | Parchamazad | 429/20 |
| 6,576,203 | B2 * | 6/2003 | Abe et al. | 422/191 |
| 6,835,354 | B2 * | 12/2004 | Woods et al. | 422/139 |

OTHER PUBLICATIONS

Olsen, Unit Processes and Principles of Chemical Engineering, pp. 1-3 (1932).*

* cited by examiner

Primary Examiner—Alexa D Neckel
Assistant Examiner—Matthew J Merkling
(74) Attorney, Agent, or Firm—Trop, Pruner & Hu, P.C.

(57) ABSTRACT

The invention generally relates to a fuel processor design and a method for manufacture. In one aspect of the invention, a fuel processor assembly has a first plate and a second plate that are mated to form a plurality of reactor housings and channels to direct the reactants. At least one of the first and second plates has an inlet orifice feature adapted to receive a hydrocarbon stream, and at least one of the first and second plates has an outlet orifice feature adapted to exhaust a reformate stream. In some embodiments, a third plate and a fourth plate can be mated to enclose the first and second plates so that a coolant can be circulated between an external surface of the first and second plates and an internal surface of the third and fourth plates.

15 Claims, 5 Drawing Sheets

FUEL PROCESSOR DESIGN AND METHOD OF MANUFACTURE

CROSS REFERENCE TO RELATED APPLICATIONS

This application claims priority under 35 USC 119(e) from U.S. Provisional Application No. 60/302,334, filed Jun. 29, 2001, naming Allen as inventor, and titled "FUEL PROCESSOR DESIGN AND METHOD OF MANUFACTURE." That application is incorporated herein by reference in its entirety and for all purposes.

BACKGROUND

The invention generally relates to a fuel processor design and a method for manufacture.

A fuel processor is a device that converts a hydrocarbon fuel into hydrogen. Examples of hydrocarbon fuels include natural gas, gasoline, methanol, etc. A common fuel processor application is to supply hydrogen to a fuel cell system, where the hydrogen is reacted to produce electricity. For example, fuel processors typically provide an output stream, referred to as reformate, that consists primary of hydrogen, carbon dioxide, water and nitrogen (from the air used to react the hydrocarbon). Exemplary fuel processor systems are described in U.S. Pat. Nos. 6,207,122, 6,190,623, 6,132,689, which are hereby incorporated by reference.

The two reactions which are generally used to covert a hydrocarbon into a reformate stream are shown in equations (1) and (2).

$$\tfrac{1}{2}O_2 + CH_4 \rightarrow 2H_2 + CO \tag{1}$$

$$H_2O + CH_4 \rightarrow 3H_2 + CO \tag{2}$$

The reaction shown in equation (1) is sometimes referred to as catalytic partial oxidation (CPO). The reaction shown in equation (2) is generally referred to as steam reforming. Both reactions may be conducted at a temperature from about 600-1,100° C. in the presence of a catalyst such as nickel with amounts of a noble metal, such as cobalt, platinum, palladium, rhodium, ruthenium, iridium, and a support such as magnesia, magnesium aluminate, alumina, silica, zirconia, by themselves or in combination. Alternatively, reforming catalysts can also be a single metal, such as nickel or platinum, supported on a refractory carrier like magnesia, magnesium aluminate, alumina, silica, or zirconia, by themselves or in combination, or promoted by an alkali metal like potassium. As an example, a platinum wash-coated ceramic monolith may be used. As further examples, catalyst pellets may be used, which may be held in a flow-through reactor canister by screens. Catalyzed plate heat exchangers may also be used. Catalyzed shell and tube heat exchangers may also be used, for example, with tubes catalyzed either internally or externally.

A fuel processor may use either of these reactions separately, or both in combination. While the CPO reaction is exothermic, the steam reforming reaction is endothermic. Reactors utilizing both reactions to maintain a relative heat balance are sometimes referred to as autothermal (ATR) reactors (note that the terms CPO and ATR are sometimes used interchangeably). Also, it should be noted that fuel processors are sometimes generically referred to as reformers, and the fuel processor output gas is sometimes generically referred to as reformate, without respect to which reaction is employed.

As evident from equations (1) and (2), both reactions produce carbon monoxide (CO). Such CO is generally present in amounts greater than 10,000 ppm. Because of the high temperature at which the fuel processor is operated, this CO generally does not affect the catalysts in the fuel processor. However, if this reformate is passed to a fuel cell system operating at a lower temperature (e.g., less than 100° C.), the CO may poison the catalysts in the fuel cell by binding to catalyst sites, inhibiting the hydrogen in the cell from reacting. In such systems it is typically necessary to reduce CO levels to less than 100 ppm. For this reason the fuel processor may employ additional reactions and processes to reduce the CO that is produced. For example, two additional reactions that may be used to accomplish this objective are shown in equations (3) and (4). The reaction shown in equation (3) is generally referred to as the shift reaction, and the reaction shown in equation (4) is generally referred to as preferential oxidation (PROX).

$$CO + H_2O \rightarrow H_2 + CO_2 \tag{3}$$

$$CO + \tfrac{1}{2}O_2 \rightarrow CO_2 \tag{4}$$

Various catalysts and operating conditions are known for accomplishing the shift reaction. For example, the reaction may be conducted at a temperature from about 300-600° C. in the presence of various catalysts including ferric oxide, chromic and chromium oxides, iron silicide, supported platinum, supported palladium, and other supported platinum group metals, by themselves or in combination. Other catalysts and operating conditions are also known. Such systems operating in this temperature range are typically referred to as high temperature shift (HTS) systems.

The shift reaction may also be conducted at lower temperatures such as 100-300° C. in the presence of other catalysts such as copper supported on transition metal oxides like zirconia, zinc supported on transition metal oxides or refractory supports like silica or alumina, supported platinum, supported rhenium, supported palladium, supported rhodium and supported gold, by themselves or in combination. Combinations of copper with cerum or rare earth metals or ceria or rare earth metal oxides are also know to exhibit high catalytic activity. Such systems operating in this temperature range are typically referred to as low temperature shift (LTS) systems. LTS reactors often utilize catalyst pellets. Other catalysts and operating conditions are also known. In a practical sense, typically the shift reaction may be used to lower CO levels to about 3,000-10,000 ppm, although as an equilibrium reaction it may be theoretically possible to drive CO levels even lower. In the context of the present invention the term "shift reactor" is sometimes used generically to cover any shift reactor configuration including HTS, LTS and others.

The PROX reaction may also be used. The PROX reaction is generally conducted at lower temperatures than the shift reaction, such as 100-200 □C. Like the CPO reaction, the PROX reaction can also be conducted in the presence of an oxidation catalyst such as platinum. The PROX reaction can typically achieve CO levels less than 100 ppm. Other non-catalytic CO reduction and reformate purification methods are also known, such as membrane filtration and pressure swing adsorption systems.

In some systems, it may be desirable to further include a desulfurization stage placed upstream from the fuel processor to remove sulfur compounds from the fuel before it is reacted (e.g., to avoid poisoning the catalysts of the fuel processor and/or the fuel cell stack). For example, activated carbon, zeolite, and activated nickel materials are all known in the art for such application.

As previously indicated, hydrogen fuel cells are a common fuel processor application. A fuel cell is an electrochemical device that converts chemical energy produced by a reaction directly into electrical energy. For example, one type of fuel cell includes a polymer electrolyte membrane (PEM), often called a proton exchange membrane, that permits only protons to pass between an anode and a cathode of the fuel cell. At the anode, diatomic hydrogen (a fuel) is reacted to produce protons that pass through the PEM. The electrons produced by this reaction travel through circuitry that is external to the fuel cell to form an electrical current. At the cathode, oxygen is reduced and reacts with the protons to form water. The anodic and cathodic reactions are described by the following equations:

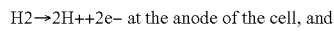

$H2 \rightarrow 2H+ +2e-$ at the anode of the cell, and

$O2+4H+ +4e- \rightarrow 2H2O$ at the cathode of the cell.

A typical fuel cell has a terminal voltage of up to about one volt DC. For purposes of producing much larger voltages, several fuel cells may be assembled together to form an arrangement called a fuel cell stack, an arrangement in which the fuel cells are electrically coupled together in series to form a larger DC voltage (a voltage near 100 volts DC, for example) and to provide more power.

The fuel cell stack may include flow field plates (graphite composite or metal plates, as examples) that are stacked one on top of the other, and each plate may be associated with more than one fuel cell of the stack. The plates may include various surface flow channels and orifices to, as examples, route the reactants and products through the fuel cell stack. Several PEMs (each one being associated with a particular fuel cell) may be dispersed throughout the stack between the anodes and cathodes of the different fuel cells. Electrically conductive gas diffusion layers (GDLs) may be located on each side of each PEM to act as a gas diffusion media and in some cases to provide a support for the fuel cell catalysts. In this manner, reactant gases from each side of the PEM may pass along the flow channels and diffuse through the GDLs to reach the PEM. The PEM and its adjacent pair of electrodes are often assembled together in an arrangement called a membrane electrode assembly (MEA) or a membrane electrode unit (MEU) when the GDLs are included.

For a given output power of the fuel cell stack, the fuel flow to the stack must satisfy the appropriate stoichiometric ratios governed by the equations listed above. The amount of a reactant supplied may be referred to in terms of "stoich". For example, for a given electrical load on a fuel cell, one stoich of hydrogen and one stoich of air would refer to the minimum amount of each reactant theoretically required to produce enough electrons to satisfy the load (assuming all of the reactants will react). However, in some cases, not all of the hydrogen or air supplied will actually react, so that it may be necessary to provide excess fuel and air stoichiometry so that the amount actually reacted will be appropriate to satisfy a given power demand.

Hydrogen that is not reacted in the fuel cell may be vented to the atmosphere with the fuel cell exhaust, and in some cases may be oxidized before it is vented. Such exhaust may also contain small amounts of hydrocarbons that "slip" through the fuel processor without being reacted. Substantial heat may be generated as these exhaust components are oxidized, for example by mixing them with air and passing them through a platinum-coated ceramic monolith similar to an automotive catalytic converter.

There is a continuing need for fuel processor designs addressing concerns and objectives including the foregoing in a robust and cost effective manner.

SUMMARY

The invention generally relates to a fuel processor design and a method for manufacture. In one aspect of the invention, a fuel processor assembly has a first plate and a second plate. The first plate is mated with the second plate to form a plurality of reactor housings. At least one of the first and second plates has an inlet orifice feature adapted to receive a hydrocarbon stream. At least one of the first and second plates has an outlet orifice feature adapted to exhaust a reformate stream.

In some embodiments, a catalyst monolith can be disposed in at least one of the plurality of reactor housings. For example, the reactor housing can be an aperture shaped to receive a ceramic wash-coated catalyst monolith. In other embodiments, catalyst pellets can be disposed in at least one of the plurality of reactor housings. The first and second plates are mated to form reactor housings and reactant communication channels for multiple reactors in a reforming process. As examples, a fuel conversion reactor such as an autothermal or reforming reactor may be housed in one of the reactor housings. Downstream from the fuel conversion reactor, a shift reactor may be provided in another reactor housing. Multiple shift reactor stages may also be provided. Other reactors supporting other reactions may also be included.

The first and second plates include features such that when they are mated, a reactant path is defined through an interior of the plates. For example, a reactant path could include an inlet orifice leading into a reactant channel that directs a hydrocarbon fuel to a conversion reactor. A second channel leads the reformate exhausted from the conversion reactor to a shift reactor to shift the gas composition toward higher hydrogen content and lower carbon monoxide content. Another channel can be defined by the union of the plates to exhaust the product from the system, for example, to a fuel cell system or some other application for hydrogen or reformate.

As examples, the first and second plates can be a metal material. For example, the plates can be stamped or molded from stainless steel or some other material. It may be desirable that the plates be thermally conductive. For example, at least one or both of the plates can have a thermal conductivity of at least 100 W/m°K. It may also be desirable that the plates be thermally insulating. For example, at least one or both of the plates can have a thermal conductivity of less than 1 W/m°K.

In some embodiments, the assembly further includes a third plate and a fourth plate that are mated to enclose the first and second plates. As an example, at least one of the third and fourth plates may have a coolant inlet feature and a coolant outlet feature, such that a coolant flow can circulated from the coolant inlet feature through an annular region between an external surface of the first and second plates and an internal surface of the third and fourth plates. The coolant would be exhausted through the coolant outlet feature.

In some cases, the third and fourth plates of such embodiments may further include a second coolant inlet and outlet, such that two separate coolant flows may be circulated through different parts of the assembly. For example, it may be desirable to control the operating temperatures of the reactors in the reactor housings independently.

In some embodiments, the third and fourth plates can have features such that when they are mated, a desired coolant path is defined across an external surface of the first and second plates. For example, it may be desirable to route a coolant such that heat is removed from a reactor housing and then supplied to a reactant inlet channel defined between the first and second plates to provide a pre-heating function to the reactants in the assembly. Similarly, it may be desirable to route a coolant flow to remove heat from the products exhausted from the assembly such that the exhausted products have a desired temperature or are below a desired level.

In another aspect, the invention provides a fuel processor assembly formed by two plates that are mated together. The first plate has an inlet orifice feature, a reactor housing feature, and an outlet orifice feature. The second plate has an inlet orifice feature, a reactor housing feature, and an outlet orifice feature. The first plate is mated with the second plate, such that the inlet orifice features of the first and second plates form an inlet orifice, the reactor housing features of the first and second plates form a reactor housing, and the outlet orifice features of the first and second plates form an outlet orifice. The inlet orifice is in fluid communication with the reactor housing, and the reactor housing is in fluid communication with the outlet orifice.

In another aspect, the invention provides a fuel processor assembly that includes a first plate and a second plate. The first plate has a first minor feature, a second minor feature, and a first major feature. The second plate also has a first minor feature, a second minor feature, and a first major feature. As an example, in this context minor features can refer to reactant channels and major features can refer to reactor housing apertures. The first and second plates are mated together, such that: (a) the first minor feature of the first plate and the first minor feature of the second plate form a reactor inlet; (b) the first major feature of the first plate and the first major feature of the second plate form a reactor housing; and (c) the second minor feature of the first plate and the second minor feature of the second plate form a reactor outlet. The reactor inlet is in fluid communication with the reactor housing, and the reactor housing is in fluid communication with the reactor outlet.

In another aspect, the invention provides a fuel processor assembly having a first plate and a second plate, where the first plate has a plurality of featured formed thereon, and where the first plate is mated with the second plate to form an inlet, a plurality of reactor apertures, and an outlet. The inlet is in fluid communication with the plurality of reactor apertures, and the reactor apertures are in fluid communication with the outlet.

In another aspect, the invention provides a method of assembling a fuel processor, including the following steps: (a) forming a first plate to define a first set of features; (b) forming a second plate to define a second set of features; and (c) mating the first and second plates to define an array of reactor apertures and fluid communication channels. In some embodiments, the operation of forming the first and second plate includes stamping a metal sheet. In other embodiments, the operation of forming the first and second plate includes molding a metal sheet.

Embodiments can also include additional steps: (a) forming a third plate to define a third set of features; (b) forming a fourth plate to define a fourth set of features; and (c) mating the third and fourth plates to enclose the first and second plates. Such methods may also include circulating a coolant through an annular region between an external surface of the first and second plates and an internal surface of the third and fourth plates.

Advantages and other features of the invention will become apparent from the following description, drawing and claims.

DETAILED DESCRIPTION

In one aspect, the invention provides a fuel processor assembly that includes two plates formed to define an array of reactor apertures and fluid communication channels between the reactor apertures. As an example, a reactor aperture may be a cylindrical cavity adapted to receive a wash-coated ceramic monolith, a catalyzed plate heat exchanger, a catalyzed shell and tube heat exchanger, a cavity to receive catalyst pellets, or more generally a cavity adapted to receive any type of reactor utilized in a fuel processor. The fluid communication channels defined by the plates allow a reactant material (e.g., natural gas, methanol, gasoline, etc.), to flow from one reactor aperture to another. In some embodiments the plates may be generally symmetrical, but this is not necessary. Embodiments may include any of the features described below, by themselves or in combination.

In another aspect, the invention provides a method of assembling a fuel processor wherein a first plate is formed to define a first set of features, and a second is formed to define a second set of features, and the plates are mated together to define an array of reactor apertures and fluid communication channels. The method may further include bonding the plates together (e.g., bolting, welding, etc.), and may also further include forming features onto at least a third plate and mating the third plate with one of the first or second plates to define at least one coolant channel. In some embodiments, the mated first and second plates may be enclosed and a second set of plates (e.g., a third plate by a fourth plate) that define coolant channels to remove heat from desired areas of the first and second plates.

Figure 1:
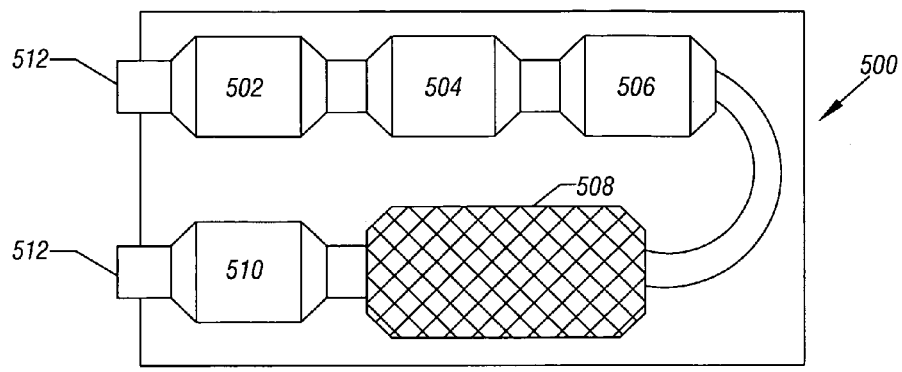
FIG. 1 is a schematic diagram of a fuel processor configuration.
Figure 2:
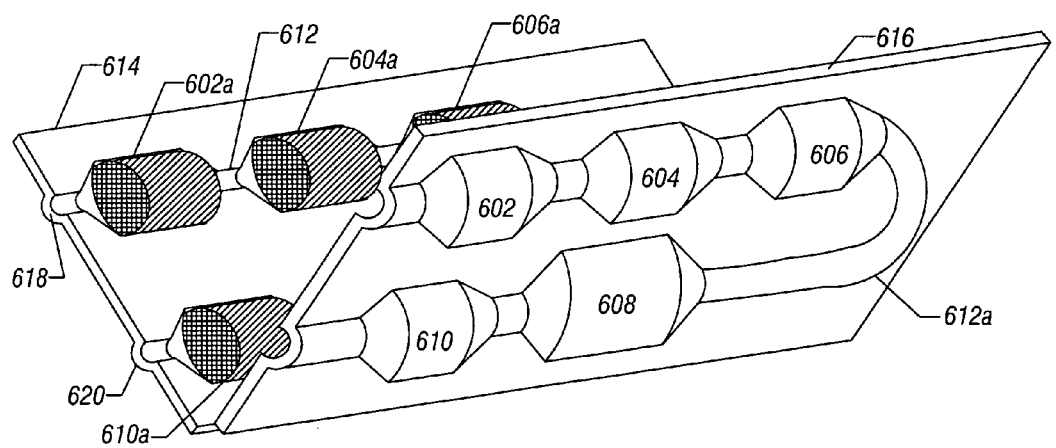
FIG. 2 is an exploded perspective view of a fuel processor configuration.

Referring to FIG. 1, a fuel processor schematic shows the layout of one possible fuel processor configuration 500. A reactant enters the fuel processor at inlet 512 and is sequentially reacted in ATR reactor 502, two-stage HTS reactors 504 and 506, LTS reactor 508, PROX reactor 510, and exits through outlet 514. An exploded perspective representation of such a system is shown in FIG. 2. A reactant enters the fuel processor at inlet 618 and is sequentially reacted in ATR reactor monolith 602a in aperture 602 (referred to as a reactor housing, aperture, or a major feature of the plate, etc.), HTS reactor monoliths 604a and 606a in apertures 604 and 606, LTS reactor (not shown) in aperture 608, PROX reactor monolith 610a in aperture 610, and exits through outlet 620. The reactor apertures 602, 604, 606, 608, and 610 are defined by plates 614 and 616 that are formed to provide these features when the plates 614 and 616 are mated. The plates 614 and 616 also define fluid communication channels such as features 612 and 612a (referred to as a reactant or fluid communication channel, or a minor feature of the plate, etc.) shown in FIG. 2. Such a design may sometimes be referred to as a "clam-shell" configuration. In some embodiments, a set of plates such as 614 and 616 can be further enclosed (e.g., in another set of formed plates) for insulation purposes. For example, the plates 614 and 616 could be enclosed by another set of formed plates (not shown) that would form a sealed air space around the outside of plates 614 and 616. This air space could be insulated or evacuated and maintained as a vacuum to prevent heat loss through plates 614 and 616. Such an outermost set of formed plates could also be made from or include an insulating material, such as a ceramic or plastic.

The plates 614 and 616 can be joined by a number of methods including, but not limited to, bolting, welding, clamping, gluing, etc. The plates may also be gasketed to prevent leakage of reactants from the apertures and fluid communication channels. In some embodiments, gaskets (not shown) may be placed between an aperture and a reactor received in the aperture to prevent the reactants from bypassing the reactors contained in the apertures. In some embodiments, insulation (not shown) may be placed between an aperture and a reactor received in the aperture to reduce heat loss from the reactor.

Figure 3:
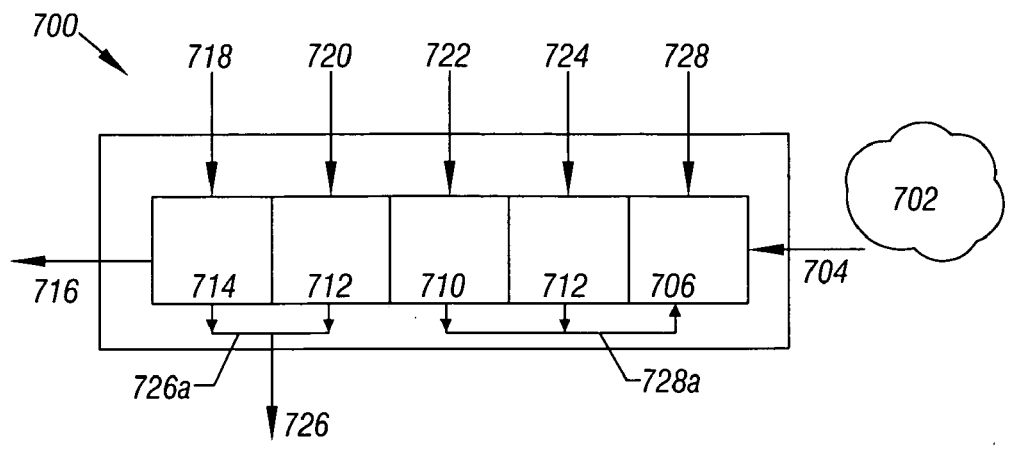
FIG. 3 is a schematic diagram of a fuel processor configuration.
Figure 4:
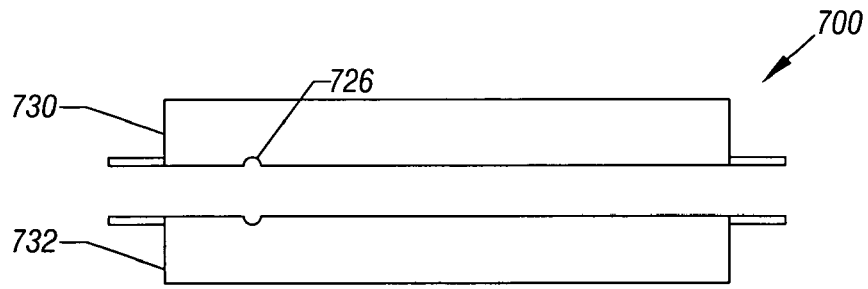
FIG. 4 is a side perspective view of the fuel processor configuration of FIG. 3.
Figure 5:
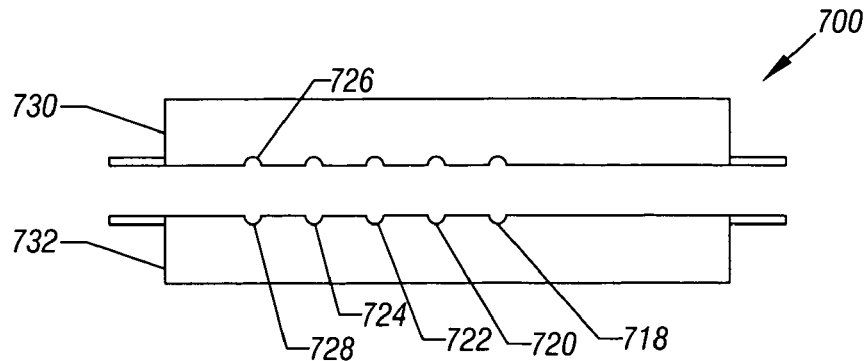
FIG. 5 is a side perspective view of the fuel processor configuration of FIG. 3.

Referring to FIG. 3, a diagram is shown of one possible fuel processor configuration 700. Side view profiles of such a configuration are shown in FIGS. 4 and 5 (with first plate 730 and second plate 732). A reactant 702 enters the fuel processor 700 at inlet 704. The reactant 702 first passes through heat exchanger 706 where it is preheated. The reactant 702 is then reacted sequentially in ATR 708, HTS 710, LTS 712, and PROX 714, and is then exits the fuel processor 700 through outlet 716. In the embodiment shown in FIG. 3, the reactors are catalyzed plate heat exchangers with the reactant 702 flowing in a first direction, and a coolant flowing in a second direction. For example, in the embodiment shown in FIG. 3, each reactor receives a separate coolant flow. The reactors can also be catalyzed shell and tube heat exchangers or other suitable heat exchangers housed in apertures defined by fuel processor housing plates are previously described. In the case of catalyzed plate heat exchangers, it may be desirable to abut or seal the outlet of one reactor against the inlet of another reactor to minimize space, thermal loss, etc. ATR temperature is maintained by coolant flow 724, HTS temperature is maintained by coolant flow 722, LTS temperature is maintained by coolant flow 720, and PROX temperature is maintained by coolant flow 718. In some embodiments, each of these coolant flows can be controlled separately, e.g., through a separately controlled pump, valve, orifice, etc. In some embodiments, such as with catalyzed plate heat exchangers, it may be desirable to provide an uncatalyzed area along the entrance of a reactor to allow increased heat transfer so that the temperature of the reactants entering the reactor can be better adjusted prior to contact with the catalyst.

In the embodiment shown in FIG. 3, the coolant flows 718 and 720 are combined in header 726a as they exit the LTS and PROX reactors, and the combined coolant flow exits the fuel processor 700 through outlet 726. Similarly, the coolant flows 722 and 724 are combined in header 728a as they exit the HTS and ATR reactors. The combined coolant flow from header 728a is then flowed through heat exchanger 706 to preheat reactants 702. The coolant exits the fuel processor 700 through outlet 728. It will be appreciated that the ATR and HTS reactors are operated at higher temperatures than the LTS and PROX reactors, so that coolant exhaust stream 728 may have a higher temperature than coolant exhaust stream 726. Coolant exhaust stream 728 may be suitable for combined heat and power ("CHP") applications where heat is removed from the coolant stream to drive another process. Coolant exhaust stream 726 may also be suitable for CHP applications. It may be desirable to keep these coolant exhaust streams separate so that stream 726 does not tend to cool stream 728. In other embodiments (not shown), it may be desirable to combine the exhaust streams to have a single coolant exhaust stream exiting the fuel processor.

Figure 6:
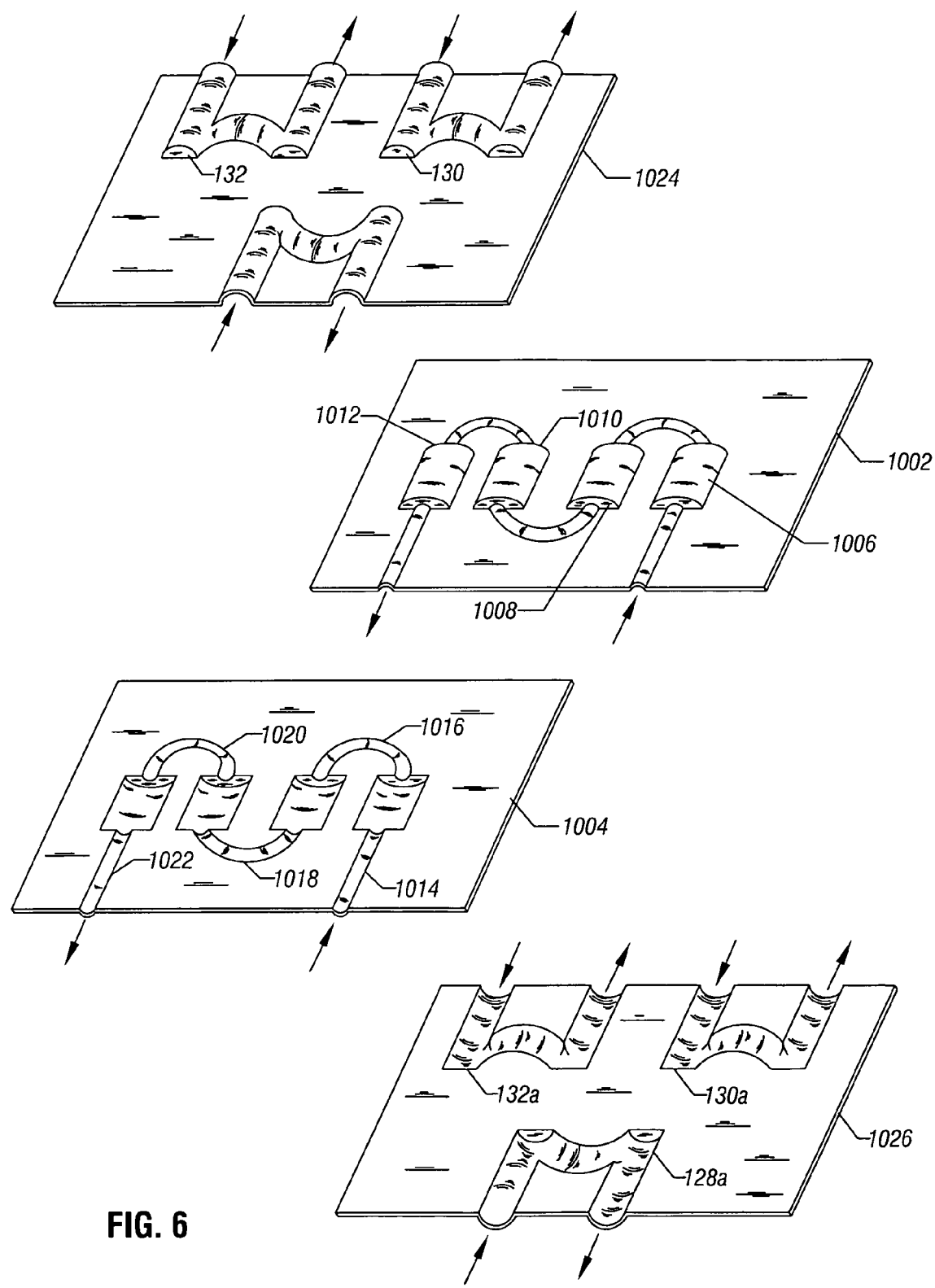
FIG. 6 is an exploded view of a fuel processor configuration.

Referring to FIG. 6, an exploded view is shown of a fuel processor configuration where a first plate 1002 and a second plate 1004 are mated to define reactor apertures 1006, 1008, 1010, and 1012, and fluid communication channels 1014, 1016, 1018, 1020, and 1022. In the embodiment shown in FIG. 6, the apertures are sized to receive catalyst coated ceramic monolith reactors. In other embodiments, the apertures could also be sized to accommodate other reactor types and combinations as well. Additional plates 1024 and 1026 sandwich plates 1002 and 1004 to define coolant channels 128, 128a, 130, 130a, 132 and 132a. An example, a coolant could be circulated through channels 128 and 128a to cool the fluid communication channel 1018 in order to lower the temperature of a reactant as it passes from reactor aperture 1008 to reactor aperture 1010.

In some embodiments, it may be desirable for plates 1002 and 1004 to be made from a metal or other thermally conductive material. It may be preferable that the material is suitable for stamping or molding to aid in the formation of the reactor apertures and flow communication channels. Further it may be preferable for the plates 1024 and 1026 to be made from a similarly formable material, but one that is less thermally conductive so that heat loss from the fuel processor is minimized. In other embodiments, plates 1024 and 1026 can be insulated to minimize heat loss. Finally, in some embodiments, plates 1002 and 1004 may include holes in proximity to flow communication channels so that coolant may be flowed through plates 1002 and 1004 as it flows through the coolant channels (e.g., 128 and 128a) on either side of plates 1002 and 1004. Other configurations are possible.

Figure 7:
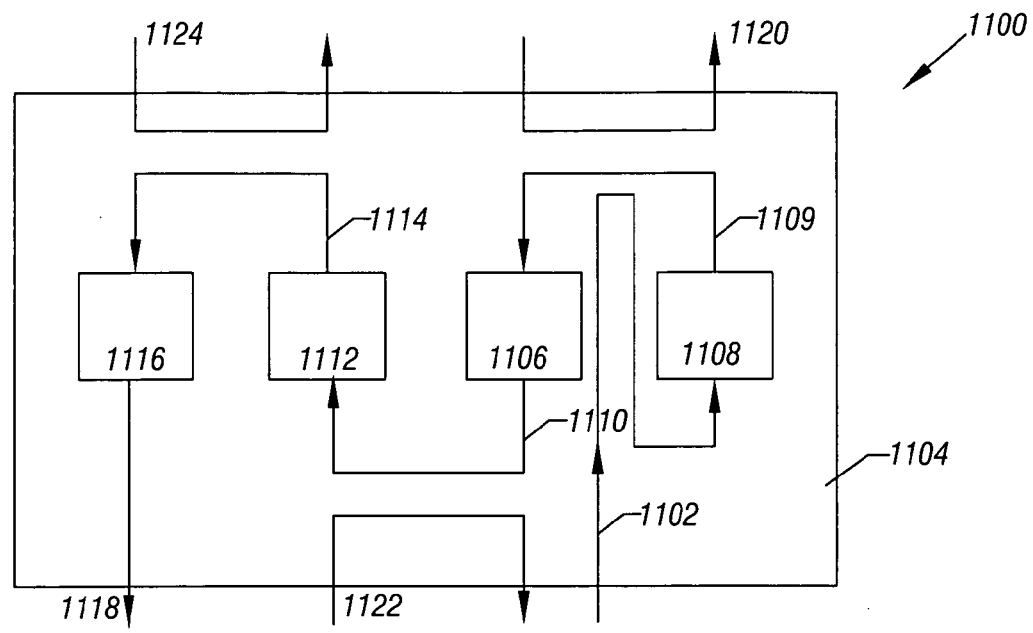
FIG. 7 is a schematic diagram of a fuel processor configuration.
Figure 8:
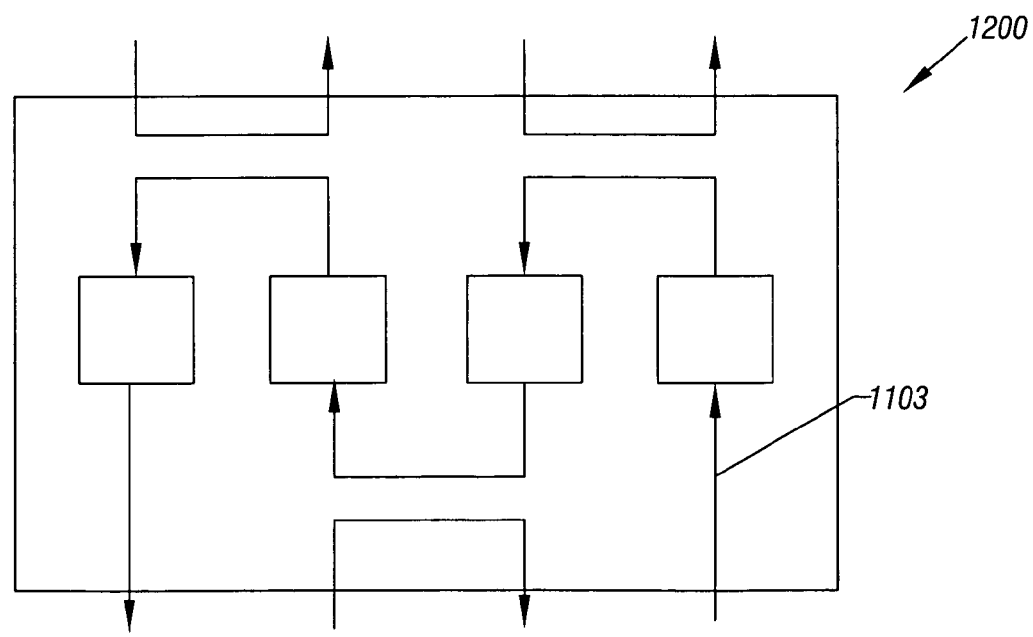
FIG. 8 is a schematic diagram of a fuel processor configuration.

FIGS. 7 and 8 shows a schematic diagram of an embodiment 1200 similar to that described in FIG. 6. In the embodiment 1100 shown in FIG. 7, the flow communication channel 1102 travels across the plate 1104 and loops between the HTS 1106 and ATR 1108 reactors before leading to the entrance to the ATR reactor 1008. By providing a longer ATR reactant inlet path that travels in proximity to the relatively high temperature ATR 1108 and 1006 reactors, the reactant is preheated before entering the ATR reactor 1108. ATR 1108 and HTS reactors are connected in fluid communication via channel 1109.

From the HTS reactor 1106, reactants are then passed through channel 1110 to LTS reactor 1112, then through channel 1114 to PROX reactor 1116. The products are exhausted from the assembly 1100 via channel 1118. Coolant channels 1120, 1122 and 1124 are provided to remove heat from reactant channels 1109, 1110 and 1114, respectively. The temperature of the reactants flowed through these channels (1109, 1110 and 1114) can thus be regulated independently. A similar embodiment is shown in FIG. 8, except that instead of the circuitous reactant inlet path 1102 that is provided in the assembly of FIG. 7, a relatively direct reactant injection inlet 1103 is provided. The other elements of the assembly 1200 in FIG. 8 are essentially the same as the assembly of FIG. 7.

Figure 9:
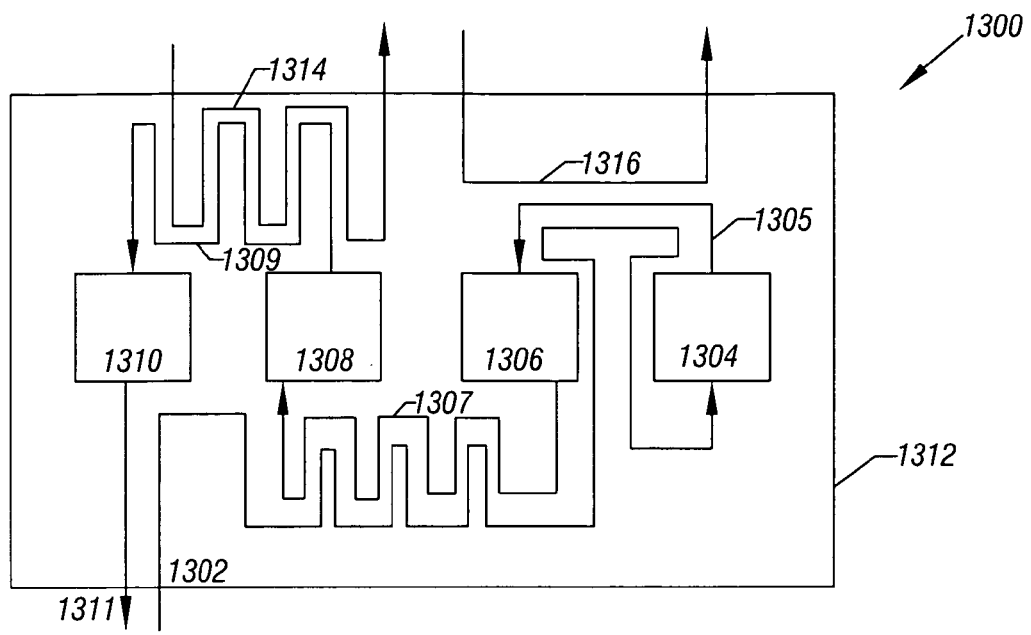
FIG. 9 is a schematic diagram of a fuel processor configuration.

In the embodiment 1300 shown in FIG. 9, the reactant inlet path 1302 to the ATR reactor 1304 travels a circuitous path in proximity to reactors 1310, 1308, 1306, and 1304. The product of the ATR reactor 1304 is transferred to the downstream reactor 1306 via channel 1305. The product of reactor 1306 is transferred to reactor 1308 via channel 1307, and the product of reactor 1308 is transferred to reactor 1310 via channel 1309. The product of reactor 1310 is exhausted from the assembly via channel 1311. These reactors operate at consecutively hotter temperatures, so that the reactant is preheated by each on its way to the ATR reactor. In this way, the plate 1312 (which is thermally conductive) and its mate (not shown) serve as a heat exchanger to preheat the reactant. In the embodiment shown in FIG. 9, the temperatures of reactors 1310, 1308, 1306, and 1304 are further controlled by fluid communication channels 1314 and 1316 that contain a circulated coolant. It will be appreciated that under the present design, the coolant and reactant paths may be selected according to how the plate 1312 and it mater are formed. For example, relatively complex serpentine channel arrangements can be provided to maximize the amount of heat transfer surface area that is provided without the need for expensive plumbing provisions.

Figure 10:
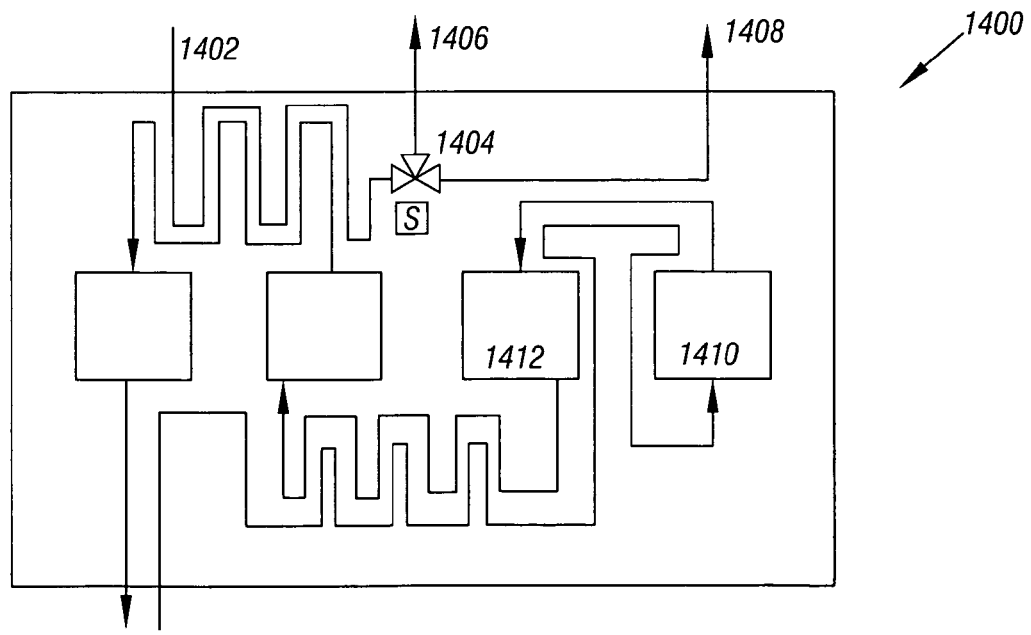
FIG. 10 is a schematic diagram of a fuel processor configuration.

Referring to FIG. 10, an embodiment 1400 is shown that is similar to that of FIG. 9, but that includes a single coolant inlet 1402 that flows through a 3-way valve 1404 to selectively flow the coolant between a first exhaust outlet 1406 and a second exhaust outlet 1408 that provides heat removal from the reactant exiting the ATR reactor 1410. For example, at low output, the 3-way valve 1404 can exhaust coolant through 1406 in order to maintain a desired temperature of the HTS reactor 1412. At high output, where more heat is being generated by ATR reactor 1410, 3-way valve 1404 can supply coolant to regulate the temperature of the HTS reactor 1412. Other embodiments are possible.

While the invention has been disclosed with respect to a limited number of embodiments, those skilled in the art, having the benefit of this disclosure, will appreciate numerous modifications and variations therefrom. It is intended that the invention covers all such modifications and variations as fall within the true spirit and scope of the invention.

What is claimed is:

1. A fuel processor assembly, comprising:
   a plurality of substantially non-planar hydrocarbon conversion reactors, comprising at least one shift reactor;
   a first plate comprising first indentations, a second plate comprising second indentations and a third plate;
   wherein the first plate is mated with the second plate to align the first indentations with the second indentations to form a plurality of reactor housings and form a serial communication path among the hydrocarbon conversion reactors between the first and second plates;
   wherein each of the hydrocarbon reactors is disposed in a different one of the reactor housings such that the reactors are received in both the first indentations and in the second indentations;
   wherein at least one of the first and second plates has an inlet orifice feature adapted to receive a hydrocarbon stream;
   wherein at least one of the first and second plates has an outlet orifice feature adapted to exhaust a reformate stream; and
   the third plate is adapted to mate with the first plate to form coolant channels between the third plate and the first plate.

2. The fuel processor assembly of claim 1, further comprising a catalyst monolith disposed in one of the plurality of reactor housings.

3. The fuel processor assembly of claim 1, further comprising catalyst pellets disposed in one of the plurality of reactor housings.

4. The fuel processor assembly of claim 1, further comprising:
   a hydrocarbon conversion reactor disposed in a first reactor housing of the plurality of reactor housings; and
   a first shift reactor disposed in a second reactor housing of the plurality of reactor housings.

5. The fuel processor assembly of claim 4, wherein the hydrocarbon conversion reactor has an operating temperature in the range of 600-1100° C., and the first shift reactor has an operating temperature in the range of 100-600° C.

6. The fuel processor assembly of claim 4, wherein the plurality of reactor housings comprise at least three reactor housings; and
   the fuel processor assembly comprises a second shift reactor disposed in a third reactor housing of the plurality of reactor housings.

7. The fuel processor assembly of claim 6, wherein the first shift reactor has an operating temperature in the range of 400-600° C., and the second shift reactor has an operating temperature in the range of 100-400° C.

8. The fuel processor assembly of claim 1, wherein the first and second plates are metal.

9. The fuel processor assembly of claim 1, wherein at least one of the first and second plates has a thermal conductivity of at least 100 W/m° K.

10. The fuel processor assembly of claim 1, wherein at least one of the first and second plates has a thermal conductivity less than 1 W/m° K.

11. A method of assembling a fuel processor, comprising:
    forming a first set of indentations in a first plate;
    forming a second set of indentations in a second plate;
    mating the first and second plates to align the first indentations with the second indentations to define an array of reactor apertures and fluid communication channels;
    disposing hydrocarbon conversion reactors comprising at least one shift reactor in the reactor apertures such that each of the reactors is disposed in a different one of the reactor apertures such that the reactors are disposed in both the first set of indentations and the set of second indentations and a serial communication path is established among the hydrocarbon conversion reactors between the first and second plates;
    forming a third plate to define a first set of orifice features to communicate a coolant and comprising substantially flat regions to at least partially surround the first set of orifice features;
    forming a fourth plate to define a second set of orifice features to communicate a coolant and comprising substantially flat regions to at least partially surround the second set of orifice features; and
    mating the third and fourth plates to enclose the first and second plates.

12. The method of claim 11, wherein the step of forming a first plate comprises stamping a metal sheet; and
    wherein the step of forming a second plate comprises stamping a metal sheet.

13. The method of claim 11, wherein the step of forming a first plate comprises molding a metal sheet; and
    wherein the step of forming a second plate comprises molding a metal sheet.

14. The fuel processor assembly of claim 1, wherein the first plate comprises first regions to form said plurality of reactor housings and second regions other than the first regions, the second plate comprises third regions to form said plurality of reactor housings and fourth regions other than the third regions, and the second and fourth regions are substantially flat.

15. The method of claim 11, further comprising:

forming first regions of the first plate to define the first set of indentations and a second region other than the first regions;

forming third regions of the second plate to define the second set of indentations and a fourth region other than the third regions; and forming the second region of the first plate and the fourth region of the second plate to be substantially flat.

\* \* \* \* \*

UNITED STATES PATENT AND TRADEMARK OFFICE
CERTIFICATE OF CORRECTION

PATENT NO.        : 7,470,294 B2
APPLICATION NO.   : 10/184291
DATED             : December 30, 2008
INVENTOR(S)       : George M. Allen It is certified that error appears in the above-identified patent and that said Letters Patent is hereby corrected as shown below:

Column 10:
Line 56, "fiat" should be --flat--.

Signed and Sealed this

Thirty-first Day of March, 2009

JOHN DOLL
*Acting Director of the United States Patent and Trademark Office*